United States Patent
Griffin

(10) Patent No.: US 6,547,341 B1
(45) Date of Patent: Apr. 15, 2003

(54) FULL FACE WHEEL WITH CHEMICAL BOND BETWEEN DISC AND RIM

(75) Inventor: Patrick M. Griffin, Canton, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/732,127

(22) Filed: Dec. 7, 2000

(51) Int. Cl.⁷ .................................................. B60B 3/10
(52) U.S. Cl. ............................. 301/63.101; 301/63.106; 29/894.322
(58) Field of Search ................... 301/63.101, 63.102, 301/63.103, 63.105, 63.106; 29/894.322, 894.323, 894.321; 156/304.1, 304.2, 307.7

(56) References Cited

U.S. PATENT DOCUMENTS

| | | | | |
|---|---|---|---|---|
| 3,506,311 A | * | 4/1970 | Nobach ................. | 301/63.103 |
| 3,612,614 A | * | 10/1971 | Ware ..................... | 301/63.101 |
| 3,859,704 A | * | 1/1975 | Nasson ................. | 301/894.322 |
| 4,212,491 A | | 7/1980 | Pinckney | |
| 4,256,348 A | * | 3/1981 | Lester et al. ........... | 301/63.105 |
| 4,518,204 A | | 5/1985 | Takada | |
| 5,526,977 A | * | 6/1996 | Wei ........................ | 29/894.322 |
| 5,538,329 A | * | 7/1996 | Stach .................... | 301/63.101 |
| 5,595,423 A | | 1/1997 | Heck et al. | |
| 5,803,553 A | | 9/1998 | Wei | |
| 5,997,102 A | * | 12/1999 | Stanavich .............. | 301/63.101 |
| 6,030,051 A | * | 2/2000 | Hosoda et al. ......... | 301/63.101 |
| 6,213,563 B1 | * | 4/2001 | Heck et al. ............ | 301/63.105 |

* cited by examiner

Primary Examiner—Russell D. Stormer
Assistant Examiner—Long Nguyen
(74) Attorney, Agent, or Firm—MacMillan, Sobanski & Todd, LLC

(57) ABSTRACT

The present invention relates to a full face wheel comprising a full face wheel disc and a partial wheel rim. The wheel disc has an annular inboard portion. The wheel rim has an annular outboard end. A chemical bond is formed between the outboard end of the wheel rim and the inboard portion of the wheel disc to secure the wheel rim to the wheel disc.

19 Claims, 3 Drawing Sheets

FULL FACE WHEEL WITH CHEMICAL BOND BETWEEN DISC AND RIM

BACKGROUND OF THE INVENTION

This invention relates in general to full face vehicle wheels, and in particular to a full face wheel having a chemical bond between a full face wheel disc and a partial wheel rim.

It is known in the art to fabricate a two piece vehicle wheel by attaching a wheel disc to a separately formed wheel rim. Typically, the wheel disc is cast or forged from metal. The wheel rim is typically formed from a flat strip of metal which is rolled into a cylindrical hoop. The adjacent edges of the hoop are butt welded together to form a cylindrical preform. The preform is formed into a wheel rim by a metal forming process such as a spin forming process. The metal forming process forms inboard and outboard tire bead retaining flanges, inboard and outboard tire bead seats and a center deepwell into the preform. The resulting wheel rim is usually attached to the wheel disc by a welding process. Both the wheel disc and the wheel rim can be formed from alloys of the same lightweight metal, such as aluminum, magnesium or titanium, or, as a further cost reduction, a wheel disc formed from an alloy of a lightweight metal can be attached to a wheel rim rolled from steel.

To further improve the appearance of the vehicle wheel, the wheel disc can be formed to include the outboard tire bead retaining flange. The resulting wheel disc, which is called a full face wheel disc, is attached to the outboard end of a partial wheel rim. The attachment can occur at the outboard tire bead seat, the deepwell, or another location. The assembled vehicle wheel is often referred to as a full face wheel. When a tire is mounted on a full face wheel, the joint between the wheel disc and the wheel rim is completely hidden and only the wheel disc is visible. A decorative finish is often applied to the face of the wheel disc to further enhance the appearance of the wheel.

SUMMARY OF THE INVENTION

The partial wheel rim and the full face wheel disc are typically attached to one another by a continuous 360 degree weld around the perimeter of the wheel. The welding process is costly in terms of production and materials.

The present invention relates to a full face vehicle wheel comprising a full face wheel disc and a partial wheel rim. The wheel disc has an annular inboard portion. The wheel rim has an annular outboard end. A chemical bond is formed between the outboard end of the wheel rim and the inboard portion of the wheel disc to secure the wheel rim to the wheel disc. The chemical bond eliminates the need for a continuous 360 degree weld, and thereby reduces the costs of production and materials. The use of a chemical bond instead of welding eliminates the waste caused by scrapping wheels having welds that leak.

The invention also contemplates a process for fabricating a full face vehicle wheel. Initially, a full face wheel disc and a partial wheel rim are formed. The wheel disc has an annular inboard portion. The wheel rim has an annular outboard end. The wheel rim is assembled onto the wheel disc. A chemical bond is formed between the outboard end of the wheel rim and the inboard portion of the wheel disc to secure the wheel rim to the wheel disc.

DETAILED DESCRIPTION OF THE PREFERRED EMBODIMENT

Figure 1:
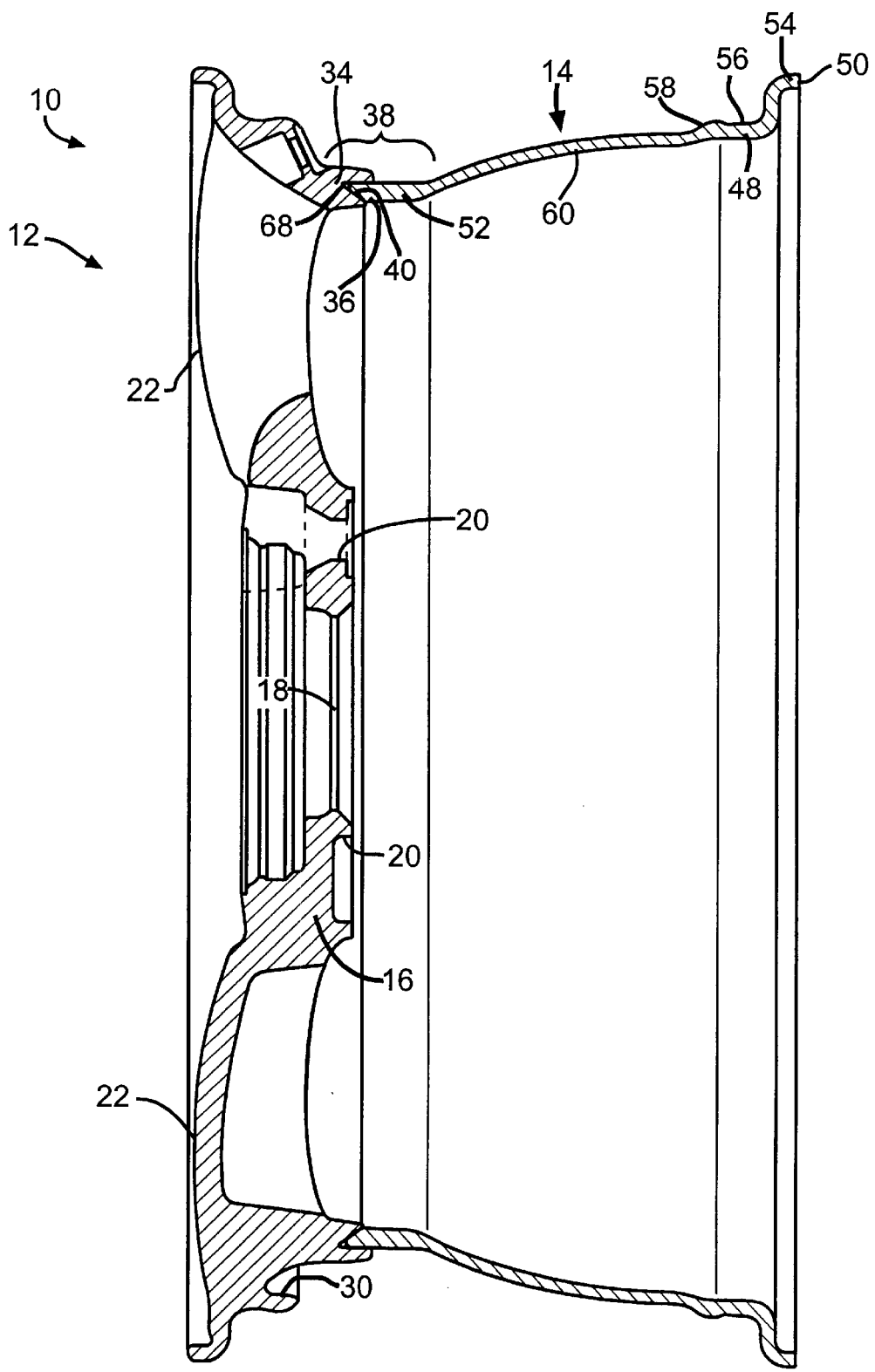
FIG. 1 is a sectional view of a full face vehicle wheel according to the present invention.
Figure 2:
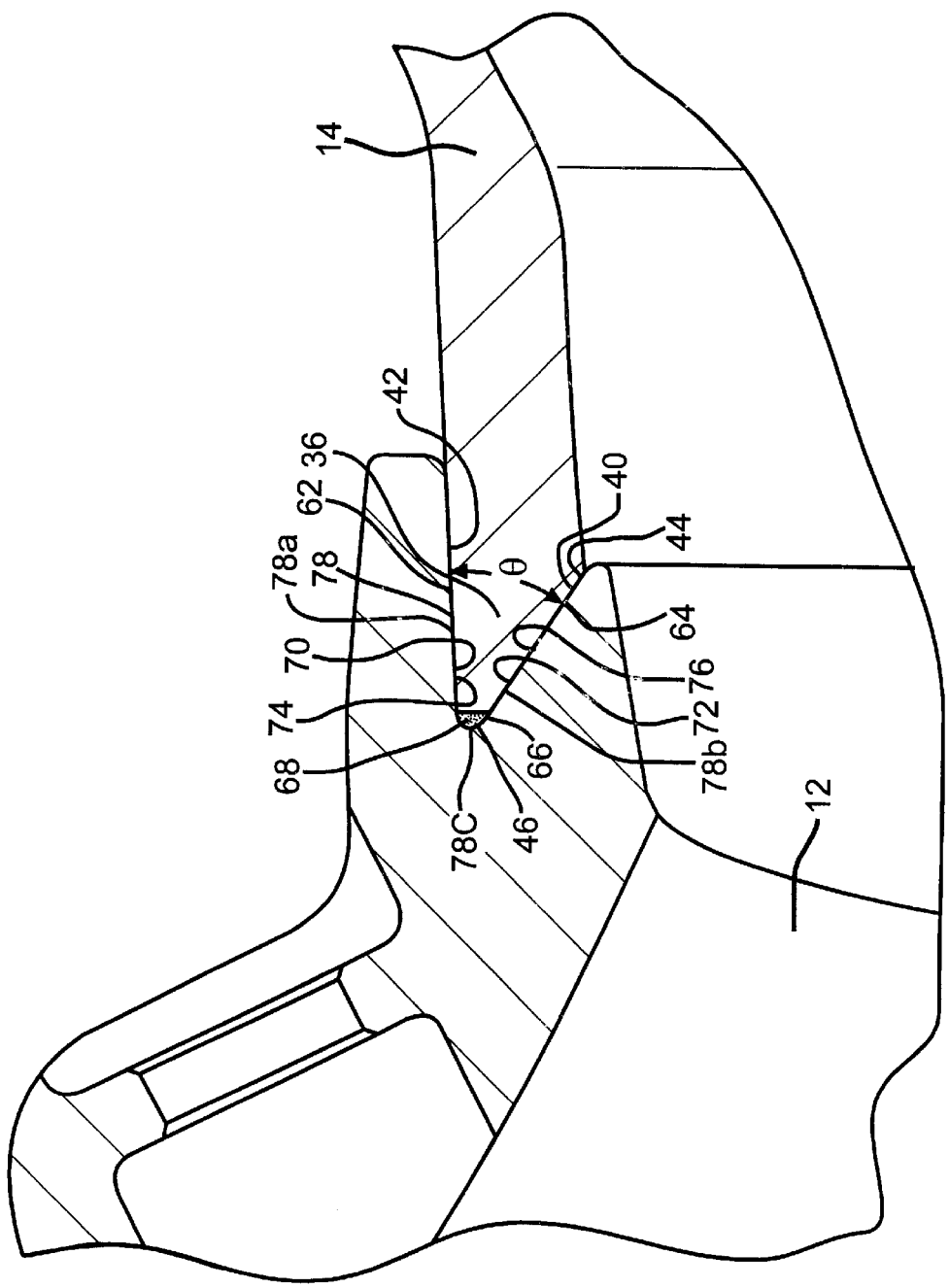
FIG. 2 is an enlarged sectional view of the joint between the partial wheel rim and the full face wheel disc of the vehicle wheel shown in FIG. 1.

Referring now to FIGS. 1 and 2, a full face vehicle wheel according to the present invention is illustrated and generally designated by the reference numeral 10. The vehicle wheel 10 comprises an axially outboard full face wheel disc 12 attached to an axially inboard partial wheel rim 14. The wheel disc 12 includes a centrally disposed wheel hub 16 having a pilot hole 18 and a plurality of wheel lug holes 20 formed therethrough. A plurality of spokes 22 extend radially outwardly from the wheel hub 16. On its perimeter portion, the wheel disc includes an outboard tire bead retaining flange 24, an outboard tire bead seat 26 and an outboard safety hump 28. A lightener channel 30 extends around the wheel disc 12 radially inwardly from the bead seat 26 and the safety hump 28. A valve stem hole 32 is formed through the perimeter of the wheel disc 12.

The wheel disc 12 further includes an annular inboard portion 34. The inboard portion 34 can be any portion of the wheel disc 12 facing the inboard direction and adapted for attachment to the outboard end 36 of the partial wheel rim 14. In the illustrated embodiment, the inboard portion 34 is a generally cylindrical portion which forms an outboard portion of the deepwell 38 of the vehicle wheel 10. Preferably, the inboard portion 34 has an annular groove 40 formed therein. The groove 40 can have any size and shape adapted for receiving the outboard end 36 of the wheel rim 14. As best shown in FIG. 2, the illustrated groove 40 has a tapered shape, defined by a first, outer groove surface 42 and a second, inner groove surface 44. The groove 40 has an inner end 46.

The wheel disc 12 may be readily cast by a conventional process, such as gravity or low pressure casting, in a mold which is relatively simple compared to the complex mold required to produce a single piece cast wheel. Alternatively, the wheel disc 12 may be forged. In a preferred embodiment, the wheel disc 12 is made of an alloy of aluminum, magnesium, titanium or a similar lightweight, high strength metal.

As shown in FIG. 1, the partial wheel rim 14 has an inboard portion 48 including an inboard end 50 (at the right in the figure), and an outboard portion 52 including an annular outboard end 36 (at the left in the figure). The inboard portion 48 of the wheel rim 14 includes an inboard tire bead retaining flange 54, an inboard tire bead seat 56, and an inboard safety hump 58. A leg portion 60 extends between the inboard portion 48 and the outboard portion 52 of the wheel rim 14. The outboard portion 52 of the wheel rim 14 forms an inboard portion of the deepwell 38 of the vehicle wheel 10. In the illustrated embodiment, the outboard portion 52 of the wheel rim 14 is thicker than the adjacent leg portion 60.

The outboard end 36 of the wheel rim 14 can have any shape adapted for attachment to the inboard portion 34 of the wheel disc 12. As best shown in FIG. 2, the illustrated outboard end 36 of the wheel rim 14 has a tapered shape which is defined by a first, outer rim surface 62 and a second, inner rim surface 64. Preferably, the outer rim surface 62 and the inner rim surface 64 are oriented at an angle θ between about 30° and about 70° relative to one another, and more preferably between about 40° and about 60°. In the illustrated embodiment, the tapered shape of the outboard end 36 of the wheel rim 14 is complementary with the shape of the groove 40. Preferably, the outboard end 36 of the wheel rim 14 has a flattened tip 66 such that a space 68 is defined between the tip 66 and the inner end 46 of the groove 40, for a purpose to be described below.

The wheel rim 14 may be fabricated by butt welding together the ends of a strip of metal formed into a cylindrical hoop, and then forming the hoop by conventional rolling or spinning operations into the shape illustrated in FIG. 1. The tapered outboard end 36 can be formed during the rolling or spinning operation, or it can be formed in a separate operation such as a machining operation. The wheel rim 14 material is preferably an alloy of aluminum but may also be an alloy of magnesium, titanium or a similar lightweight, high strength metal. Alternatively, the wheel rim 14 can be formed from steel.

The wheel rim 14 is assembled onto the wheel disc 12 in any suitable manner. In the illustrated embodiment, the outboard end 36 of the wheel rim 14 is inserted into the groove 40 in the wheel disc 12 in a slip fit. When the outboard end 36 of the wheel rim 14 is received in the groove 40, the outer rim surface 62 mates with the outer groove surface 42, and the inner rim surface 64 mates with the inner groove surface 44. Preferably, a gap 70 is provided between the mating surfaces, for a purpose described below. The gap 70 can be provided by any suitable means, such as by one or more recesses 74 formed in one or more of the mating surfaces. In the embodiment shown in FIG. 2, an outer gap 70 is provided between the outer rim surface 62 and the outer groove surface 42, and an inner gap 72 is provided between the inner rim surface 64 and the inner groove surface 44. The outer gap 70 is provided by forming a recess 74 in the outer groove surface 42, and the inner gap 72 is provided by forming a recess 76 in the inner groove surface 44. Alternatively, the outer and inner gaps 70, 72 could be provided by forming recesses (not shown) in the outer and inner rim surfaces 62, 64. Preferably, the outer gap 70 and the inner gap 72 have a width between about 0.1 inch and about 1 inch, and more preferably between about 0.1 inch and about 0.3 inch. Preferably, the outer gap 70 and the inner gap 72 have a thickness between about 0.001 inch and about 0.01 inch, and more preferably between about 0.002 inch and about 0.006 inch. The groove 40 and the recesses 74 and 76 can be formed during the casting or forging operation, or they can be formed in a separate operation such as a machining operation.

After the wheel rim 14 is assembled onto the wheel disc 12, a chemical bond 78 is formed between the outboard end 36 of the wheel rim 14 and the inboard portion 34 of the wheel disc 12 to secure the wheel rim 14 to the wheel disc 12. By "chemical bond" is meant a bond formed by chemical means rather than mechanical means. Any suitable chemical bond 78 can be used to secure the wheel rim 14 to the wheel disc 12. Typically, the chemical bond 78 is an adhesive bond. Any adhesive can be used which is capable of forming a sufficiently strong bond between the metal surfaces of the wheel rim 14 and the wheel disc 12. An example of a suitable adhesive is Scotch Weld™ Duo-Pak Adhesive, e.g., DP-420 or DP-805, manufactured by 3M.

Preferably, at least a portion of the chemical bond 78 is disposed inside the groove 40. More preferably, at least a portion of the chemical bond 78 is disposed inside the gap 70 between the groove 40 and the outboard end 36 of the wheel rim 14. In the illustrated embodiment, an outer portion 78a of the chemical bond 78 is disposed inside the outer gap 70 between the outer rim surface 62 and the outer groove surface 42, and an inner portion 78b of the chemical bond 78 is disposed inside the inner gap 72 between the inner rim surface 64 and the inner groove surface 44. The illustrated chemical bond 78 also includes a portion 78c disposed inside the space 68 between the flattened tip 66 of the outboard end 36 of the wheel rim 14 and the inner end 46 of the groove 40. The chemical bond 78 disposed inside the outer and inner gaps 70, 72 and the space 68 provides a significantly stronger bond than a chemical bond disposed in a groove without any gaps or space. Preferably, the chemical bond 78 extends substantially continuously and substantially completely around the vehicle wheel 10. More preferably, the chemical bond 78 creates a leak-proof seal between the outboard end 36 of the wheel rim 14 and the inboard portion 34 of the wheel disc 12.

Optionally, an intermittent or spot weld (not shown) can be formed between the outboard end 36 of the wheel rim 14 and the inboard portion 34 of the wheel disc 12 to assist the chemical bond 78 in securing the wheel rim 14 to the wheel disc 12. The use of an intermittent weld instead of a continuous 360 degree weld results in faster weld times and reduces material costs. The intermittent weld can be an outside diameter weld or an inside diameter weld.

Figure 3:
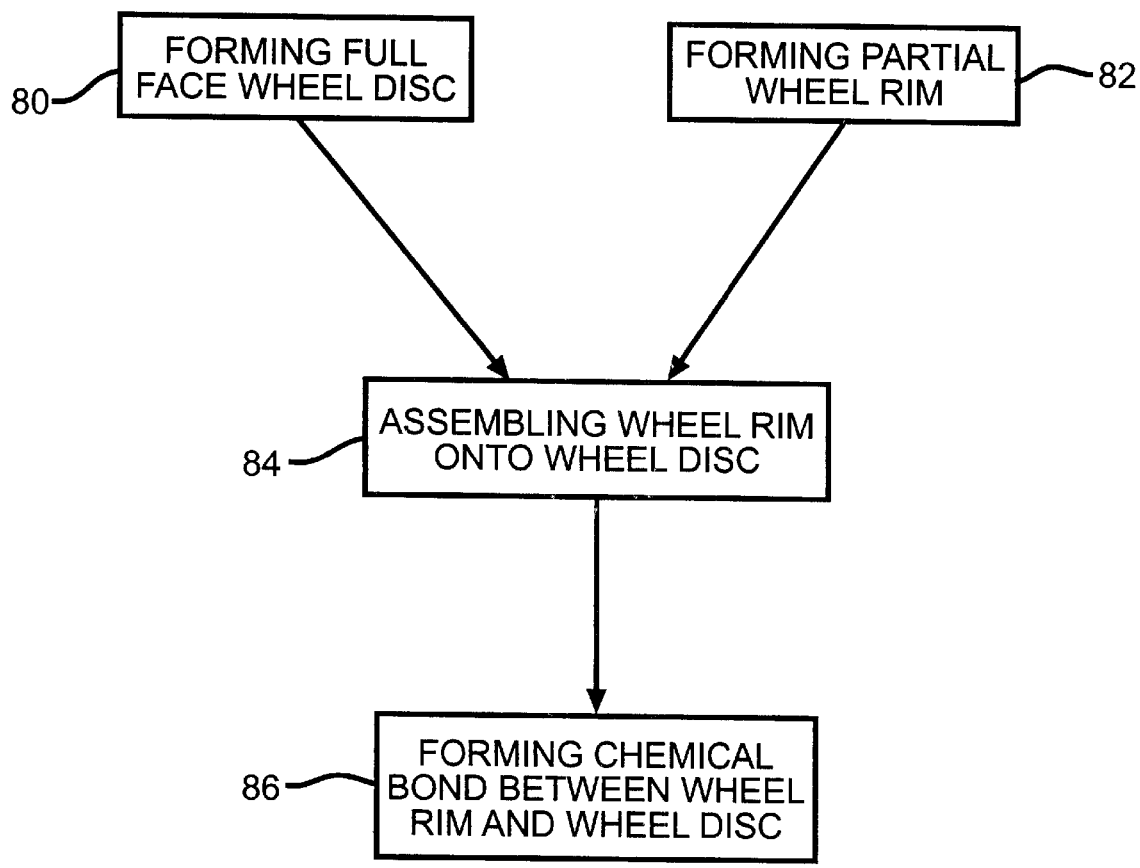
FIG. 3 is a flow chart of a process for fabricating a full face vehicle wheel in accordance with the invention.

The invention further contemplates a process for fabricating the full face vehicle wheel 10 shown in FIGS. 1 and 2. The process is illustrated by the flow chart shown in FIG. 3. In functional block 80, a full face wheel disc 12 is formed by a conventional method such as casting or forging. The wheel disc 12 includes an annular inboard portion 34. Concurrently, in functional block 82, a partial wheel rim 14 is formed by a conventional method such as rolling or spinning. The wheel rim 14 includes an annular outboard end 36. In functional block 84, the wheel rim 14 is assembled onto the wheel disc 12. Finally, in functional block 86, a chemical bond 78 is formed between the outboard end 36 of the wheel rim 14 and the inboard portion 34 of the wheel disc 12 to secure the wheel rim 14 to the wheel disc 12.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the invention is illustrated in relation to a full face vehicle wheel 10 having a particular structure, it should be recognized that the invention also applies to different structures of vehicle wheels.

What is claimed is:

1. A full face wheel comprising:
   a full face wheel disc having an annular inboard portion;
   a partial wheel rim having an annular outboard end; and
   a chemical bond only between the outboard end of the wheel rim and the inboard portion of the wheel disc to secure the wheel rim to the wheel disc.

2. The full face wheel defined in claim 1 wherein the inboard portion of the wheel disc has a groove formed therein, the outboard end of the wheel rim is received in the groove, and at least a portion of the chemical bond is disposed inside the groove.

3. A full face wheel comprising:
   a full face wheel disc having an annular inboard portion, the inboard portion having a groove formed therein;
   a partial wheel rim having an annular outboard end that is received in the wheel disc groove, the wheel disc groove and the outboard end of the wheel rim having respective mating surfaces;

a gap provided between the mating surfaces of the wheel disc groove and the outboard end of the wheel rim; and a chemical bond between the outboard end of the wheel rim and the inboard portion of the wheel disc to secure the wheel rim to the wheel disc, at least a portion of the chemical being disposed within the wheel disc groove and inside the gap.

4. The full face wheel defined in claim 3 wherein the gap is provided by a recess formed in the mating surface of the groove.

5. The full face wheel defined in claim 3 wherein the gap has a width between about 0.1 inch and about 1 inch and a thickness between about 0.002 inch and about 0.1 inch.

6. The full face wheel defined in claim 3 wherein the outboard end of the wheel rim has a tapered shape defined by an outer rim surface and an inner rim surface, the groove has a complementary tapered shape defined by an outer groove surface and an inner groove surface, the outer rim surface mates with the outer groove surface, and the inner rim surface mates with the inner groove surface.

7. The full face wheel defined in claim 6 wherein an outer gap is provided between the outer rim surface and the outer groove surface, and an inner gap is provided between the inner rim surface and the inner groove surface, and at least a portion of the chemical bond is disposed inside each of the outer gap and the inner gap.

8. The full face wheel defined in claim 6 wherein the inner rim surface is oriented at an angle between about 30° and about 70° relative to the outer rim surface.

9. The full face wheel defined in claim 6 wherein the tapered outboard end of the wheel rim has a flattened tip such that a space is defined between the tip and an inner end of the groove, and at least a portion of the chemical bond is disposed inside the space.

10. The full face wheel defined in claim 3 wherein the chemical bond is an adhesive bond.

11. A full face wheel comprising:

a full face wheel disc having an annular inboard portion, the inboard portion having a groove formed therein;

a partial wheel rim having an annular outboard end that is received in the wheel disc groove;

a chemical bond between the outboard end of the wheel rim and the inboard portion of the wheel disc to secure the wheel rim to the wheel disc, at least a portion of the chemical bond being disposed within the wheel disc groove; and an intermittent weld between the outboard end of the wheel rim and the inboard portion of the wheel disc to assist in securing the wheel rim to the wheel disc.

12. The full face wheel defined in claim 2 wherein the chemical bond extends substantially continuously and substantially completely around the full face wheel.

13. The full face wheel defined in claim 12 wherein the chemical bond creates a leak-proof seal between the outboard end of the wheel rim and the inboard portion of the wheel disc.

14. A process for fabricating a full face wheel comprising the following steps:

(a) forming a full face wheel disc having an annular inboard portion;

(b) forming a partial wheel rim having an annular outboard end;

(c) applying a chemical to a portion of one of the wheel disc and the wheel rim;

(d) assembling the wheel rim onto the wheel disc; and (e) forming a chemical bond only between the outboard end of the wheel rim and the inboard portion of the wheel disc to secure the wheel rim to the wheel disc.

15. The process defined in claim 14 wherein the inboard portion of the wheel disc has a groove formed therein, the outboard end of the wheel rim is received in the groove when the wheel rim is assembled onto the wheel disc, and at least a portion of the chemical bond is disposed inside the groove.

16. A process for fabricating a full face wheel comprising the following steps:

(a) forming a full face wheel disc having an annular inboard portion, the inboard portion having a groove formed therein;

(b) forming a partial wheel rim having an annular outboard end;

(c) assembling the wheel rim onto the wheel disc with the outboard end of the wheel rim being received within the groove in the inboard portion of the wheel disc, the groove and the outboard end of the wheel rim having respective mating surfaces, a gap being provided between the mating surfaces; and (d) forming a chemical bond between the outboard end of the wheel rim and the inboard portion of the wheel disc to secure the wheel rim to the wheel disc, with at least a portion of the chemical bond being disposed in the gap between the mating surfaces of the wheel rim and the wheel disc.

17. The process defined in claim 16 wherein the gap is provided by forming a recess in the mating surface of the groove.

18. The process defined in claim 16 wherein the gap has a width between about 0.1 inch and about 1 inch and a thickness between about 0.002 inch and about 0.1 inch.

19. The process defined in claim 15 wherein the outboard end of the wheel rim has a tapered shape defined by an outer rim surface and an inner rim surface, the groove has a complementary tapered shape defined by an outer groove surface and an inner groove surface, the outer rim surface mates with the outer groove surface, the inner rim surface mates with the inner groove surface, an outer gap is provided between the outer rim surface and the outer groove surface, an inner gap is provided between the inner rim surface and the inner groove surface, and at least a portion of the chemical bond is disposed inside each of the outer gap and the inner gap.

* * * * *